United States Patent [19]

Gomez

[11] 4,172,482

[45] Oct. 30, 1979

[54] METHOD AND APPARATUS FOR ADJUSTING SINGLE REEDS FOR MUSICAL INSTRUMENTS

[76] Inventor: Harold M. Gomez, 7 Beachview Cres., Toronto, Ontario, Canada

[21] Appl. No.: 895,172

[22] Filed: Apr. 11, 1978

[51] Int. Cl.[2] .......................... B23Q 3/00; B27M 1/00

[52] U.S. Cl. .................................. 144/309 R; 83/454; 83/861; 144/323; 269/295

[58] Field of Search ............. 83/454, 861; 144/288 R, 144/288 C, 321, 323, 309 R; 269/293, 295, 303; 84/383 R

[56] References Cited

U.S. PATENT DOCUMENTS

| | | | |
|---|---|---|---|
| 683,524 | 10/1901 | Tinkham | 269/295 |
| 1,341,445 | 5/1920 | Stanley | 269/295 |

*Primary Examiner*—Robert Louis Spruill

*Assistant Examiner*—W. D. Bray

*Attorney, Agent, or Firm*—Arne I. Fors

[57] ABSTRACT

A method and apparatus for adjusting reeds for single reed musical instruments. The apparatus comprises a support member having a pair of guide strips adjustably secured thereto for receiving and aligning a reed with the said support member center line, said support member having a plurality of slots formed in a lip at one end thereof for receiving a sharp cutting instrument for cutting the reed tip.

The method comprises seating a reed to be adjusted having a thin tapered tip on said support member and forming at least one cut in said tip parallel to the reed longitudinal axis without removal of tip material whereby adjacent portions of the tip are free to independently vibrate.

15 Claims, 5 Drawing Figures

METHOD AND APPARATUS FOR ADJUSTING SINGLE REEDS FOR MUSICAL INSTRUMENTS

BACKGROUND OF THE INVENTION

This invention relates to reeds for musical instruments and in particular relates to a method and apparatus for adjusting reeds for single reed musical instruments.

Reeds for musical instruments normally are commercially made of cane, which due to inconsistencies in the thickness of the cane and variations in physical properties of the cane such as hardness caused by improper seasoning, does not lend itself to the production of reeds which are closely reproducible. Accordingly, often one or two reeds only out of a package of several reeds made in the same manner are found to be satisfactory and the remaining reeds are rejected.

U.S. Pat. Nos. 1,506,364; 1,667,836; and 2,287,529 disclose design modifications of reeds by the provision of longitudinal or transverse grooves in the surfaces of the reeds in an effort to enhance tone qualities. However, none of these patents permits adjustment of the reeds by the user to compensate for variations in physical properties of the reeds.

U.S. Pat. No. 3,420,132 proposes to overcome deficiencies inherent in cane reeds such as lack of control of tone quality and poor reproducibility in manufacture by providing a reed of two or more different materials such as glass fiber and stainless steel. It is taught in this patent, column 3, lines 25–46, that the stiffness of the tip of the reed is an important physical property, well known to woodwind players, which is commonly altered by scraping and trimming of the reed. However, the mass of the tip of conventional reeds which affects tone allegedly cannot be adjusted. Although a reed is shown having longitudinal slots formed therein, the air gaps formed by the slots would impede tone qualities and adjustment by the user of the reed, made of, for example, stainless steel would not be possible.

STATEMENT OF INVENTION

I have found that a cane reed can be adjusted to modify and enhance tone qualities by selectively cutting the reed tip along the reed fibers. The apparatus of my invention comprises, in general, a support member having a centre line and a pair of guide strips adjustably secured to the support member for defining a reed-receiving space therebetween wherein said reed can be centrally disposed and secured on the support member in alignment with the said support member centre line, said support member having a plurality of slots formed at one end for receiving a sharp cutting instrument, each of said slots extending through said support member and including at least one slot symmetrically disposed on each side of a central slot in alignment with said support member centre line.

The method of my invention is typified by the steps of seating a reed to be adjusted having a thin tapered tip on a support member having a centre line and a pair of guide strips adjustably secured to the support member for defining a reed-receiving space therebetween wherein said reed can be centrally disposed and secured on the support member in alignment of the reed longitudinal axis with the said support member centre line, and forming at least one cut in said tip parallel to the reed longitudinal axis without removal of tip material whereby adjacent portions of the tip are free to independently vibrate.

It is a principal object of the present invention to provide a method and apparatus for adjusting conventional cane reeds heretofore rejected for lack of desired tone qualities to suit the user's preferences and tastes.

It is another object of my invention to provide a method and apparatus for adjusting cane reeds which are simple and reliable in operation.

BRIEF DESCRIPTION OF THE DRAWINGS

These and other objects of the invention and the manner in which they can be attained will become apparent from the following description of the drawings, in which.

DESCRIPTION OF THE PREFERRED EMBODIMENT

Figure 1:
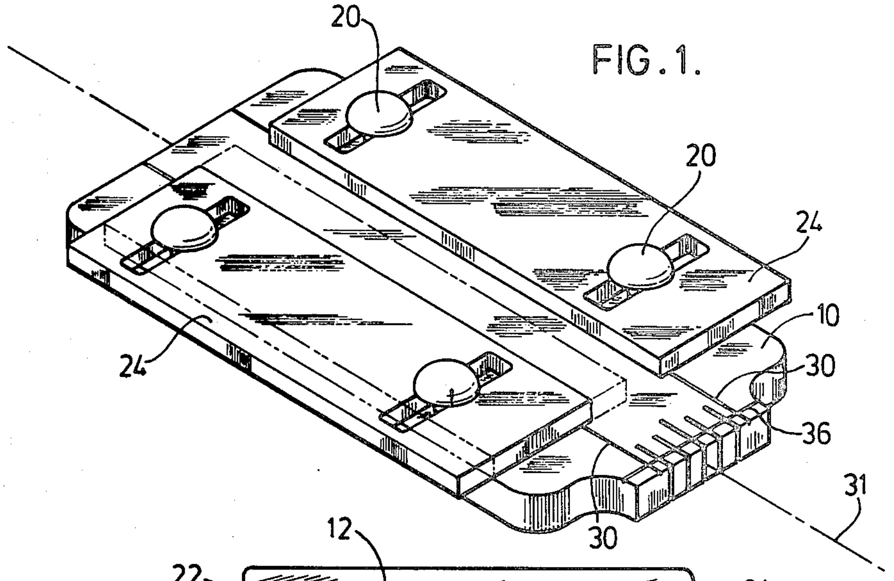
FIG. 1 is a perspective view of the apparatus of my invention.

The apparatus illustrated in FIGS. 1–4 comprises a substantially flat and generally rectangular support member 10 having recesses 12, 14 formed in its sides and a protruding lip 16 formed at one end.

Four symmetrically positioned holes 18 are adapted to receive bolts 20 having wing nuts 22 for adjustably securing guide strips 24 to support member 10. Each of guide strips 24 has a pair of spaced transverse slots 26, 28 adapted to receive bolts 20 permitting the guide strips 24 to be retracted together to provide a compact unit for storage when not in use, as shown by ghost lines in FIG. 1, and to be extended apart to snugly receive a reed 29 therein, as shown most clearly in FIGS. 3 and 4, for longitudinal alignment of the reed with the geometrical centre line 31 of the support member. Longitudinal guide lines 30 are provided to assist in alignment of the reed.

Support member 10 and guide strips 24 preferably are made of clear transparent plexiglass; the former about ¼" thick and 2"×4" in size and the latter about ⅛" thick and 1"×3" in size with slots 26, 28 adapted to receive 3/16" carriage bolts 20.

Figure 2:
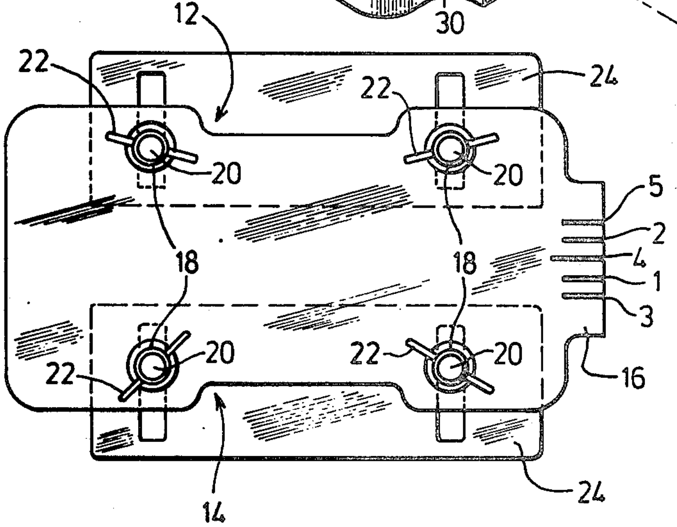
FIG. 2 is an underside view of the apparatus shown in FIG. 1.

A plurality of parallel longitudinal slots designated by numerals 1–5 inclusive are formed in lip 16, shown most clearly in FIG. 2, to receive a cutting instrument such as razor blade 32.

The lateral spacing of slots 1–5 varies according to the size of the reed to be adjusted. For the reeds of Bb and Eb Clarinets and a Soprano Saxophone, slot 4 is positioned on the centre line 31 of support member 10, first adjacent slots 1 and 2 are spaced 6.5/64" from and symmetrical about slot 4 and next adjacent slots 3 and 5 are spaced 3/32" from slots 1 and 2 respectively. Slots 3 and 5 thus are each spaced about 1/16" from the edges of a reed of about ½"–33/64" width. Commencing from the edge of lip 16 or from transverse line 36, which if present preferably is 1/16" from the tip of lip 16, slot 4 is 13/64" long, slots 1 and 2 are 5/32" long and slots 4 and 5 are 9/64" long.

For reeds for the Bass Clarinet, Alto Clarinet, Alto Saxophone and the like, slots 1 and 2 first adjacent to central slot 4 are spaced 8.5/64" from and symmetrical about slot 4 and next adjacent slots 3 and 5 are spaced 7/64" from slots 1 and 2 respectively. Slots 3 and 5 are spaced about 3/32" from the edges of the reed. As measured above, slot 4 is 19/64" long, slots 1 and 2 are ¼" long and slots 3 and 5 are 15/64" long.

In operation, the user centres reed 29 on support member 10 with the thin tapered tip 33 of the reed co-extensive with the edge of lip 16 or with line 36. Guide strips 24 are adjusted against the sides of the reed to centrally secure the reed on support member 10 and wing nuts 18 tightened. A sharp cutting instrument such as a double-edge razor blade 32 is used to cut through the tip of the reed, along one or more of slots 1–5, the length of the slot commencing with slot 1 and progressing through the sequence of slots 2, 3, 4, and 5 until the tone quality of the reed satisfies the user. A thin blade such as a double-edged razor blade is necessary to avoid damage to the reed fibers during cutting.

Adjustment of the reed is personal and the number of cuts made will depend on the physical characteristics of the reed, i.e. thickness, hardness and the like and on the tone quality variations produced as the sequence of cuts is made. Once the desired cut or cuts are made, the reed should be placed on a flat surface and the reed surface at the cut or cuts rubbed until no visible sign of a cut is present. The forming of slots or upset of reed surface is undesirable since the passage of air over the reed will be undesirably affected.

I have found that cuts along slots 1 and 2 create freer vibrations if the reed is too hard, cuts along slots 3 and 5 reduce vibrations if the reed is too soft and a cut along slot 4 provides an even tone and improved high notes. The reed should be tested after each cut to determine the number and/or position of cuts desired. Conventional reeds often are thicker on the side adjacent slot 5 and a partial cut only is recommenced in slot 5 with testing before completion of the cut to the depth of slot 5.

Figure 5:
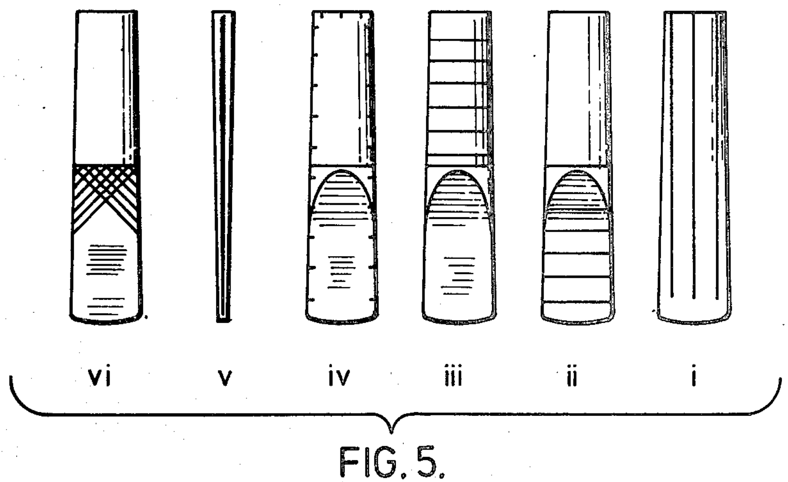
FIG. 5 is a plan view showing modifications to reeds to enhance tone qualities.
Figure 3:
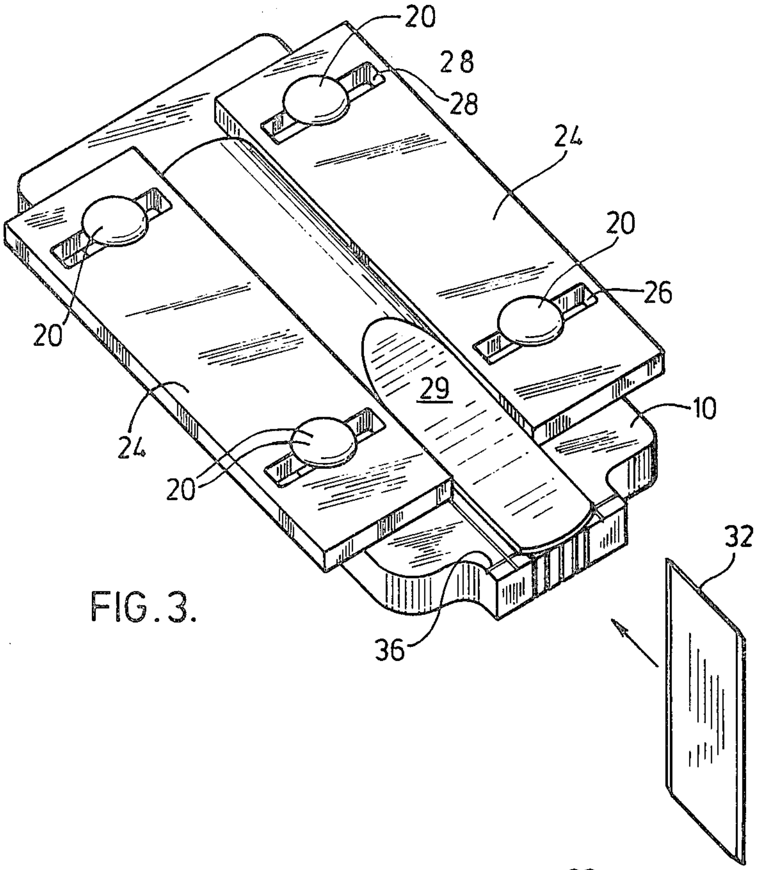
FIG. 3 is a perspective view similar to FIG. 1 illustrating a reed held in an operative position.
Figure 4:
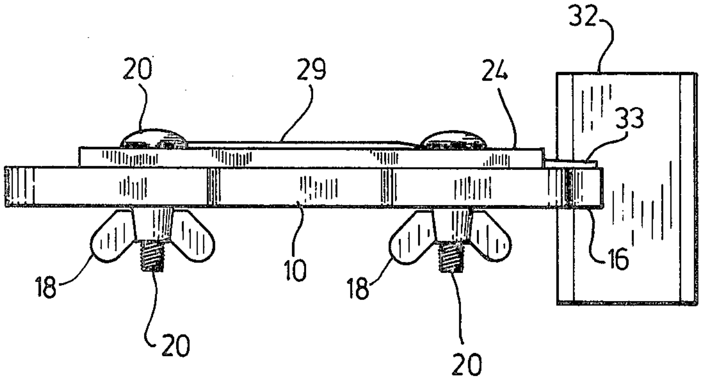
FIG. 4 is a side elevation showing a cut formed in the tip of a reed.

FIG. 5 illustrates additional adjustments possible to a reed by the making of superficial surface scratches by a razor blade thereon if the reed remains too hard after cuts in slots 1–5. Surface scratches (i) through to (vi) should be made in progression with testing of the reed after each series of surface scratches.

It will be understood of course that modifications can be made in the embodiment of the invention illustrated and described herein without departing from the scope and purview of the invention as defined by the appended claims.

What I claim as new and desire to protect by Letters Patent of the United States is:

1. An apparatus for adjusting the tone quality of a reed of a musical instrument comprising a support member having a geometrical centre line and a pair of guide strips adjustably secured to the support member for defining a reed-receiving space therebetween wherein said reed can be centrally disposed and secured on the support member in alignment with the said support member centre line, said support member having a plurality of slots formed at one end for receiving a sharp cutting instrument, each of said slots extending through said support member and including at least one slot symmetrically disposed on each side of a central slot in alignment with said support member centre line.

2. An apparatus as claimed in claim 1 in which said plurality of slots comprises a central slot and a pair of slots symmetrically disposed on each side of said central slot, said central slot having a greater length than the symmetrically disposed slots.

3. An apparatus as claimed in claim 2 in which said central slot is about 13/64" long, said first adjacent slots are about 5/32" long and the second adjacent slots are about 9/64" long.

4. An apparatus as claimed in claim 2 in which said support member has a line transverse to said slots formed about 1/16" from the adjacent edge of the support member and, measured from said line, the central slot is about 13/64" long, the next adjacent slots are about 5/32" long and the next adjacent slots are about 9/64" long.

5. An apparatus as claimed in claim 1, 3 or 4 in which said support member has a projecting lip and said slots are formed in said lip.

6. An apparatus as claimed in claim 2, 3, or 4 in which the slots first adjacent the central slot are each spaced 6.5/64" from the central slot and the slots second adjacent the central slot are spaced about 3/32" from the first adjacent slots.

7. An apparatus as claimed in claim 2, 3 or 4 in which the slots first adjacent the central slot are each spaced 8.5/64" from the central slot and the slots second adjacent the central slot are spaced about 7/64" from the first adjacent slots.

8. An apparatus as claimed in claim 2 in which said central slot is about 19/64" long, said first adjacent slots are about ¼" long and the second adjacent slots are about 15/64" long.

9. An apparatus as claimed in claim 1, 3 or 4 in which said guide strips each has a pair of spaced transverse slots formed therein and said support member has two pairs of holes formed therein for receiving bolts adapted to be aligned with said slots whereby said guide strips can be retracted when not in use to be substantially co-extensive with the support member and extended for use to receive a reed therebetween.

10. A method for adjusting the tone quality of a reed of a musical instrument comprising the steps of seating a reed to be adjusted having a thin tapered tip on a support member having a geometrical centre line and a pair of guide strips adjustably secured to the support member for defining a reed-receiving space therebetween wherein said reed is centrally disposed and secured on the support member with alignment of the reed longitudinal axis with the said support member centre line, and making at least one cut in said tip parallel to the reed longitudinal axis without removal of tip material whereby adjacent portions of the tip are free to independently vibrate.

11. A method as claimed in claim 10 in which said cut is made centrally in the reed tip for a length of 13/64" or 19/64".

12. A method as claimed in claim 10 in which a pair of cuts is made in the reed tip symmetrically about the reed centre line about 6.5/64" from the said centre line for a length of 5/32" to permit freer vibrations of the tip.

13. A method as claimed in claim 10 in which a pair of cuts is made in the reed tip symmetrically about the reed centre line about 8.5/64" from the said centre line for a length of ¼" to permit freer vibrations of the tip.

14. A method as claimed in claim 10 in which a pair of cuts is made in the reed tip symmetrically about the reed centre line about 12.5/64" from the centre line for a length of 9/64" to reduce vibrations of the tip.

15. A method as claimed in claim 10 in which a pair of cuts is made in the reed tip symmetrically about the reed centre line about 15.5/64" from the said centre line for a length of 15/64" to reduce vibrations of the tip.

* * * * *